United States Patent [19]
Chapple

[11] Patent Number: 5,477,821
[45] Date of Patent: Dec. 26, 1995

[54] PISTON FOR INTERNAL COMBUSTION ENGINE

[75] Inventor: Paul M. Chapple, Columbus, Ind.

[73] Assignee: Cummins Engine Company, Inc., Columbus, Ind.

[21] Appl. No.: 417,177

[22] Filed: Apr. 5, 1995

[51] Int. Cl.⁶ .................................................. F02F 3/00
[52] U.S. Cl. .................................. 123/193.6; 92/208
[58] Field of Search ........................ 123/193.6, 193.4; 92/208, 222

[56] References Cited

U.S. PATENT DOCUMENTS

| | | | |
|---|---|---|---|
| 1,975,345 | 10/1934 | Baker | 92/208 |
| 4,253,435 | 3/1981 | McCandles | 123/193.6 |
| 4,282,837 | 8/1981 | Holtman et al. | 123/193.6 |
| 4,383,509 | 5/1983 | Bauer | 123/193.6 |
| 5,081,968 | 1/1992 | Bruni | 123/193.6 |
| 5,425,306 | 6/1995 | Binford | 123/193.6 |

Primary Examiner—Marguerite Macy

[57] ABSTRACT

A piston for an internal combustion engine. The piston has upper and lower compression rings and a recess between the two which exposes a greater proportion of the ring end gap for the lower compression ring. As a result, the space between the rings and below the lower compression ring provides a capacitance volume to minimize top ring reversal.

4 Claims, 1 Drawing Sheet

PISTON FOR INTERNAL COMBUSTION ENGINE

TECHNICAL FIELD

The present invention relates to a piston and more specifically a piston for heavy duty internal combustion engine.

BACKGROUND ART

Heavy duty internal combustion engines and more specifically diesel engines, have accounted for a high percentage of the prime power for heavy duty on-highway truck applications. Over the many years these engines have been utilized, there have been continuing efforts to enhance durability, reliability and performance. One of the principle performance criteria by which an engine is judged is normal oil consumption. In early years it was not uncommon to have oil consumption as low as 1 quart for every 100 miles. Because of current efforts oil consumption has been greatly improved. One of the ways in which oil consumption has attempted to be improved is by recognizing the role of top compression ring reversal in unseating at or near top dead center. The typical modern day piston has a plurality of compression rings on an annular piston with an oil control ring at the bottom. The top compression ring is the first barrier to gas pressures passing down the side wall of the piston. As the engine is displaced toward a top dead center or a minimum volume, the pressure in the cylinder keeps the top compression ring seated against the lower wall of its ring groove. When combustion takes place, the pressure on the piston also tends to force the ring against its lower seat. However, when by-pass gases from the combustion process leak through the end gap or other clearances at the top ring, a dynamic and momentary pressure is created in-between the top ring and the second from the top ring. This temporary increase of pressure exists at a time when the combustion pressures are decaying as the piston is displaced towards bottom dead center. Frequently this pressure can rise to a point where it is greater than the pressure in the combustion chamber. As a result the top ring is unseated from the lower wall of its ring groove, thus permitting oil to pass into the combustion chamber. The consequence of this is an increase in oil consumption.

There have been a number of approaches to achieve a greater than normal volume between the top two compression rings so that the volume acts as an accumulator to delay the buildup of pressure and thus prevent the pressure from exceeding that of the combustion gases to cause unseating of the top ring. Such examples are found in U.S. Pat. Nos. 4,253,435 and 4,282,837. While these approaches take a step towards preventing top ring reversal. It is not possible for them to achieve a sufficiently great capacitance volume between the two rings in order to properly delay the buildup of pressure on the lower side of the top compression ring.

DISCLOSURE OF THE INVENTION

It is an object of the present invention to further enhance the size of the accumulator volume in a piston of the above type to prevent top ring reversal.

In accordance with the present invention the above objects are achieved by a piston for an internal combustion engine comprising an annular crown portion in an integral ring carrying annular portion which has upper and lower annular ring grooves for receiving upper and lower split compression rings. The annular ring carrying portion has another annular groove below the lower annular ring groove for receiving an oil control ring. The ring carrying portion has an upper annular recess between the upper and lower ring grooves, the annular recess being defined by a frustro conical wall section extending from a point adjacent and below the upper ring groove to a cylindrical wall section extending away from the upper ring groove and intersecting the upper face of the lower ring groove at a point that is sufficiently radially inward of the outer diameter of the piston to expose the gap between the ends of the split lower compression ring to the annular recess between the upper and lower ring grooves. The ring carrying annular portion has an additional lower annular recess defined by a first cylindrical wall section substantially in line with the cylindrical wall section of the upper annular recess and extending from the lower ring groove toward the oil ring groove to a frustro conical wall section extending radially outward to the outer diameter of the ring carrying annular portion. As a result, blowby combustion gases are connected to the space between the lower compression ring groove and the oil ring groove to minimize transient pressure buildup on the lower side of the upper split compression ring.

DETAILED DESCRIPTION OF PREFERRED EMBODIMENTS

Figure 1:
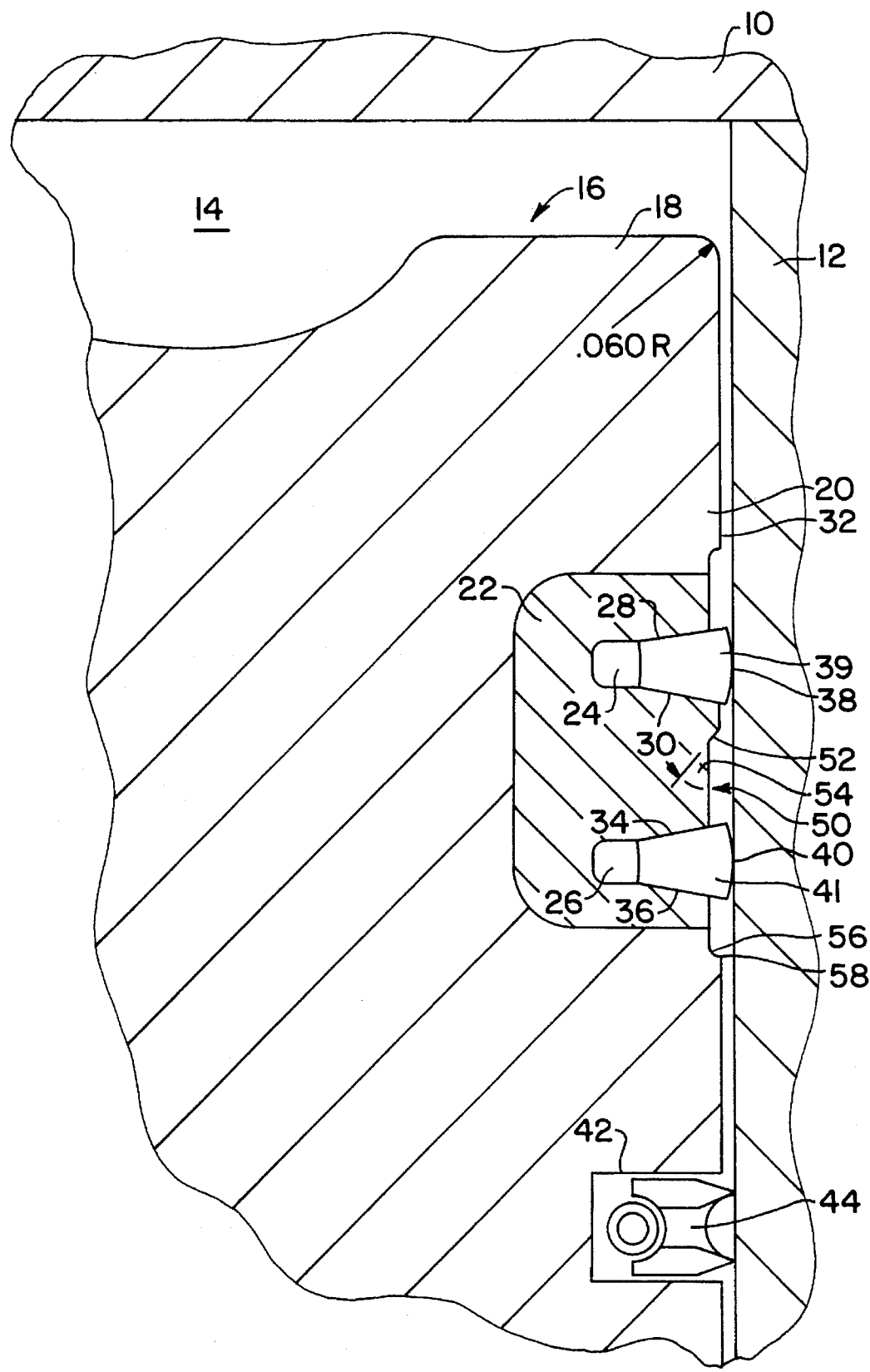
FIG. 1 is a partial longitudinal section view of a piston embodying the present invention.

FIG. 1 illustrates a portion of an internal combustion engine comprising a head 10 seated over a cylinder liner 12 to form in combination with a piston generally referred to at 16, a variable volume combustion chamber 14. The piston 16 has a wrist pin (not shown) connected to a connecting rod (also not shown) which in turn is mounted on a crankshaft (also not shown) to convert the reciprocating movement of the piston 16 in the liner 12 to rotary movement at the output of the crankshaft. The details of the manner in which the piston 16 is connected in the engine are omitted to simplify the discussion of the present invention.

The piston 16 comprises a crown 18 which is contoured in particular ways to promote efficient combustion within the combustion chamber 14. Integral with the crown portion 18 is a ring carrying annular section 20 extending lengthwise along the side of the liner 12. The piston 16 is usually made of a light alloy aluminum and is cast around an annular ni-resist insert 22 which forms structural support for upper and lower split compression ring grooves 24 and 26, respectively. In this discussion, the terms upper and lower are used to facilitate an understanding of the invention in relation to FIG. 1 where the piston 16 is oriented so that its crown 18 is at the top of the drawing. It should be apparent that in practice, the cylinder may be oriented in directions other than that shown in FIG. 1. Upper groove 24 is formed from upper and lower diverging wall sections 28 and 30 respectively which extend to the nominal outer diameter 32 of piston 16. Lower groove 26, likewise has tapered diverging upper and lower wall portions 34 and 36, respectively. Grooves 24 and 26 receive keystone cross-section split piston rings 38 and 40 which have end gaps 39 and 41, respectively. The configuration of these piston rings is well known in the art and need not be discussed in this application. A third annular ring groove 42 with non-diverging side walls is formed in the ring carrying annular section 20 of the piston 16 at a point below the lower ring groove 26; annular groove 42 receives an oil control ring 44 whose purpose is to ensure that sufficient lubrication film is provided on the cylinder walls but kept away from the combustion chamber.

In operation, the piston 16 moves towards the head 10 to reduce the volume in combustion chamber 14. Upon combustion (in the case of the diesel engine it is induced by compression ignition) the piston 16 is forced downward and some of the pressure from the combustion gases bypasses the upper compression ring 38 past ring gap 39. As described previously, this temporary passage of combustion gases can cause an increase in pressure on the bottom side of compression ring 38 which causes it to unseat from the lower wall 30 and thus permit oil consumption. In accordance with the present invention, an annular recess 50 described below minimizes, if not eliminates, the above problems.

The recess 50 comprises a first frustro conical wall section 52 extending from the outer diameter 32 of the piston 16 below and adjacent the ring groove 24 for the upper compression ring 38. Preferably, frustro conical wall section 52 makes a 45 degree angle with respect to the axis of the piston 16. The frustro conical wall section 52 adjoins a cylindrical wall section 54 which extends therefrom to intersect the upper wall 34 of lower ring groove 26. It should be noted that the cylindrical wall section 54 is displaced inward from the outer diameter 32 of the piston 16 sufficient to expose a greater portion of the split between the ends 41 of ring 40. The purpose of this is to provide a gas flow to connection a greater portion of the space 41 between the split ring 40. The recess 50 further comprises a cylindrical wall section 56 substantially in line with cylindrical wall section 54 and extending from lower wall 36 of the lower ring groove 26 in a direction away from the crown 18 of the piston 16. Cylindrical wall section 56 intersects a frustro conical section 58 extending from there to the outer diameter 32 of the piston. Preferably, this section also makes a 45 degree angle with respect to the axis of piston 16. As a result of the annular recess 50, the substantial volume between the lower split ring 40 and the oil control ring 44 is opened up so as to significantly minimize the temporary buildup of pressure beneath the top ring 38.

In operation, as the piston 16 moves downward on the combustion cycle, some combustion gases blowby piston ring 38 into the space beneath the upper and lower rings 38 and 40. However, because of recess 50 exposing a greater portion of the ring gap 41 in ring 40, not only is the actual space between the rings available as an accumulator volume but the space between the lower ring 40 and the oil control ring 44. Experience with actual or tests has shown that this produces a significant decrease in oil consumption owing to a substantial minimization, if not elimination, of top ring reversals.

While a specific embodiment of the invention has been described, it should be apparent to those skilled in the art that it may be practiced in other forms without departing from its spirit and scope.

Having thus described the invention what is claimed as novel and desired to be secured by letters patent of the United States is:

1. A piston for an internal combustion engine, said piston comprising an annular crown portion and an integral annular ring carrying portion having upper and lower annular compression ring grooves for receiving upper and lower split compression rings and another annular oil ring groove below the lower annular groove for receiving an oil control ring, said ring carrying portion having an upper annular recess between said upper and lower compression ring grooves, said annular recess being defined by a frustro conical wall section extending from a point adjacent and below said upper compression ring groove to a cylindrical wall section extending away from said lower compression ring groove at a point sufficiently radially inward of the outer diameter of said piston to expose the gap between the ends of the split lower compression ring to the annular recess between said upper and lower compression ring grooves, said ring carrying portion having a lower annular recess defined by a first cylindrical wall section substantially in line with the cylindrical wall section of said upper annular recess and extending from said lower compression ring groove toward said oil ring groove to a frustro conical wall section extending radially outward to the outer diameter of said ring carrying portion, whereby blowby combustion gases are connected to the space above and below said lower compression groove to minimize transient pressure buildup on the lower side of the upper split compression ring.

2. A piston as in claim 1 wherein the angle of the frustro conical wall section of the upper annular recess is approximately 45 degrees with respect to the longitudinal axis of said piston.

3. A piston as in claim 1 wherein the angle of the frustro conical wall section of said lower annular recess is approximately 45 degrees with respect to the longitudinal axis of said piston.

4. A piston in claim 3 wherein the angle of the frustro conical wall section of said lower annular recess is approximately 45 degrees with respect to the longitudinal axis of said piston.

* * * * *